(12) United States Patent
Liu

(10) Patent No.: US 11,057,853 B2
(45) Date of Patent: Jul. 6, 2021

(54) METHODS AND APPARATUS FOR INDICATING AND DETERMINING SYNCHRONIZATION BLOCK, AND BASE STATION AND USER EQUIPMENT

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/646,733

(22) PCT Filed: Sep. 20, 2017

(86) PCT No.: PCT/CN2017/102469
§ 371 (c)(1),
(2) Date: Mar. 12, 2020

(87) PCT Pub. No.: WO2019/056210
PCT Pub. Date: Mar. 28, 2019

(65) Prior Publication Data
US 2020/0305099 A1    Sep. 24, 2020

(51) Int. Cl.
*H04W 56/00* (2009.01)
*H04B 7/06* (2006.01)
(Continued)

(52) U.S. Cl.
CPC ........ *H04W 56/001* (2013.01); *H04B 7/0617* (2013.01); *H04L 1/1614* (2013.01); *H04W 72/0446* (2013.01); *H04W 84/042* (2013.01)

(58) Field of Classification Search
CPC ........... H04W 56/001; H04W 72/0446; H04W 84/042; H04B 7/0617; H04L 1/1614
(Continued)

(56) References Cited

U.S. PATENT DOCUMENTS

2014/0321375 A1    10/2014  Agiwal et al.
2016/0028530 A1*    1/2016  Gong .................. H04L 27/2602
                                                  370/329
(Continued)

FOREIGN PATENT DOCUMENTS

CN        101904153 A      12/2010
CN        106712883 A       5/2017
(Continued)

OTHER PUBLICATIONS

NTT DOCOMO. [Draft] LS on NR Initial Access and Mobility. 3GPP TSG RAN WG1 Meeting #90 R1-1715259, Aug. 25, 2017 (Aug. 25, 2017), pp. 1 to 3.
(Continued)

*Primary Examiner* — Nghi H Ly
(74) *Attorney, Agent, or Firm* — Syncoda LLC; Feng Ma

(57) ABSTRACT

A method for indicating a synchronization block includes: determining a beam to be sent; generating indication information, wherein the indication information comprises the number of beam packets, and an identifier for indicating whether each beam, except the beam to be sent, of each beam packet for sending a synchronization signal block (SSB) sends an SSB; and sending, to a user equipment, an SSB and indication information corresponding to the beam to be sent.

16 Claims, 8 Drawing Sheets

(51) Int. Cl.
*H04L 1/16* (2006.01)
*H04W 72/04* (2009.01)
*H04W 84/04* (2009.01)

(58) Field of Classification Search
USPC .............................. 455/450, 422.1, 418, 423
See application file for complete search history.

(56) References Cited

U.S. PATENT DOCUMENTS

2016/0205564 A1* 7/2016 Ren .................... H04L 27/362
370/252
2016/0212631 A1 7/2016 Shen et al.
2018/0288753 A1* 10/2018 Kishiyama .......... H04W 72/044
2020/0028560 A1* 1/2020 Gao .................... H04B 7/0639

FOREIGN PATENT DOCUMENTS

| CN | 106793058 A | 5/2017 |
| CN | 106851816 A | 6/2017 |
| WO | 2016152655 A1 | 9/2016 |

OTHER PUBLICATIONS

Huawei et al. WF on Indication of Actual Transmitted SS Blocks. 3GPP TSG RAN WG1 Meeting #90 R1-1714678, Aug. 25, 2017 (Aug. 25, 2017), entire document.
3GPP TR 38.811 V0.1.0 (Jun. 2017), 3rd Generation Partnership Project, Technical Specification Group Radio Access Network; Study on New Radio (NR) to support Non Terrestrial Networks, Release 15.
International Search Report in the international application No. PCT/CN2017/102469, dated May 29, 2018.
English translation of the Written Opinion of the International Search Authority in the international application No. PCT/CN2017/102469, dated May 29, 2018.
InterDigital Inc. "On SS Block and Burst Set Design and Indication" 3GPP TSG RAN WG1 Meeting #90 R1-1714129 Prague, Czech Republic, Aug. 21-25, 2017.
First Office Action of the Chinese application No. 201780001438.3, dated Sep. 17, 2020.
Vivo: "Discussion on beam measurement, beam reporting and beam indication", 3GPP Draft; R1-1715619 Discussion on Beam Measurement, Beam Reporting and Beam Indication, 3rd Generation Partnership Project (3GPP), Mobile Competence Centre; 650, Route Des Lucioles; F-06921 Sophi, vol. RAN WG1, No. Nagoya, Japan; Sep. 18, 2017-Sep. 21, 2017 Sep. 17, 2017 (Sep. 17, 2017), XP051339086, * Section 22.1*.
Samsung: "On Beam Management, Measurement and Reporting", 3GPP Draft; R1-1715940, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017 (Sep. 17, 2017), XP051339399, Retrieved from the Internet: URL: http://www.3gpp.org/ftp/Meetings_3GPP_SYNC/RAN1/Docs/ [retrieved on Sep. 17, 2017] *Sections 2 and 4.3 *.
Interdigital Communication; "On Synchronization Signal Block and Indication", 3GPP Draft; R1-1705498 on Synchronization Signal Block and Indication, 3Rrd Generation Partnership Project (3GPP), Mobile Competence Centre; 650, Route Des Lucioles; F-06921 Sophia-Antipolis Cedex; vol. RAN WG1, No. Spokane, USA; Apr. 3, 2017-Apr. 7, 2017 Apr. 2, 2017 (Apr. 2, 2017), XP051243627, *Section 24*.
Supplementary European Search Report in the European application No. 17925965.0, dated Mar. 26, 2021.

* cited by examiner

METHODS AND APPARATUS FOR INDICATING AND DETERMINING SYNCHRONIZATION BLOCK, AND BASE STATION AND USER EQUIPMENT

CROSS-REFERENCE TO RELATED APPLICATIONS

This application is a national stage of International Application No. PCT/CN2017/102469 filed on Sep. 20, 2017, the disclosure of which is hereby incorporated by reference in its entirety.

TECHNICAL FIELD

The disclosure relates to the field of communication technology, and in particular to a method and device for synchronization block indication and determination, a base station, User Equipment (UE), and a computer-readable storage medium.

BACKGROUND

With rapid development of wireless communication technology, a 5th Generation (5G) system has appeared. A 5G system is to be oriented to an application in a high frequency band, i.e., a band of 6 GHz and above. Due to poor characteristics of propagation of a radio wave in a high frequency band, conventional omnidirectional transmission will no longer apply. Beam scan and beam management may have to be introduced for communication.

In a latest discussion of a 3rd Generation Partnership Project (3GPP), it is agreed to send a Synchronization Signal Block (SSB) for a default beam. However, in practice there may be a number of synchronization blocks for the default beam, not all of which may be sent. Therefore, UE has to be informed as to which beam an SSB that is actually sent corresponds.

In related art, a bitmap may be used to indicate a beam for which an SSB is sent and a beam for which an SSB is not sent, leading to major bit overhead.

SUMMARY

In view of this, the application provides a method and device for synchronization block indication and determination, a base station, User Equipment (UE), and a computer-readable storage medium, capable of flexibly denoting any SSB sent by a base station as well as reducing bit overhead.

According to a first aspect of embodiments of the subject disclosure, a method for synchronization block indication applies to a base station. The method includes:
determining a to-be-sent beam;
generating indication information, the indication information including a number of groups of beams and an identifier, the identifier identifying whether an SSB is sent for a beam other than the to-be-sent beam in a group of beams for which an SSB is sent; and
sending, to User Equipment (UE), the indication information and the SSB for the to-be-sent beam.

In an embodiment, the method may further include:
grouping beams according to the number of groups of beams.

In an embodiment, the indication information may further include an identifier identifying whether an SSB is sent for a group of beams.

According to a second aspect of embodiments of the subject disclosure, a method for synchronization block determination applies to User Equipment (UE). The method includes:
receiving, from a base station, an SSB sent for a to-be-sent beam and indication information, the indication information including a number of groups of beams and an identifier, the identifier identifying whether an SSB is sent for a beam other than the to-be-sent beam in a group of beams for which an SSB is sent;
acquiring a Time Indication (TI) by parsing the SSB sent for the to-be-sent beam, and determining a location of the SSB in a group of beams including the SSB according to the TI and the number of groups of beams; and
inserting, at the location in the group of beams including the SSB, an identifier identifying that the SSB is sent for the to-be-sent beam, and determining the SSB sent by the base station according to the inserted identifier and the identifier identifying whether an SSB is sent for a beam other than the to-be-sent beam in the group of beams including the SSB.

In an embodiment, the indication information may further include an identifier identifying whether an SSB is sent for a group of beams.

According to a third aspect of embodiments of the subject disclosure, a device for synchronization block indication applies to a base station. The device includes a determining module, a generating module, and a sending module.

The determining module is adapted to determining a to-be-sent beam.

The generating module is adapted to generating indication information. The indication information includes a number of groups of beams and an identifier. The identifier is adapted to identifying whether an SSB is sent for a beam other than the to-be-sent beam in a group of beams for which an SSB is sent.

The sending module is adapted to sending, to User Equipment (UE), the indication information and the SSB for the to-be-sent beam.

In an embodiment, the device may further include a grouping module.

The grouping module may be adapted to grouping beams according to the number of groups of beams.

In an embodiment, the indication information may further include an identifier identifying whether an SSB is sent for a group of beams.

According to a fourth aspect of embodiments of the subject disclosure, a device for synchronization block determination applies to User Equipment (UE). The device includes a receiving module, a parsing determining module, and an inserting determining module.

The receiving module is adapted to receiving, from a base station, an SSB sent for a to-be-sent beam and indication information. The indication information includes a number of groups of beams and an identifier. The identifier is adapted to identifying whether an SSB is sent for a beam other than the to-be-sent beam in a group of beams for which an SSB is sent.

The parsing determining module is adapted to acquiring a Time Indication (TI) by parsing the SSB sent for the to-be-sent beam, and determining a location of the SSB in a group of beams including the SSB according to the TI and the number of groups of beams.

The inserting determining module is adapted to inserting, at the location in the group of beams including the SSB, an identifier identifying that the SSB is sent for the to-be-sent beam, and determining the SSB sent by the base station according to the inserted identifier and the identifier identifying whether an SSB is sent for a beam other than the to-be-sent beam in the group of beams including the SSB.

In an embodiment, the indication information may further include an identifier identifying whether an SSB is sent for a group of beams.

According to a fifth aspect of embodiments of the subject disclosure, a base station includes a processor and memory.

The memory is adapted to storing an instruction executable by the processor.

The processor is adapted to:

determining a to-be-sent beam;

generating indication information, the indication information including a number of groups of beams and an identifier, the identifier identifying whether an SSB is sent for a beam other than the to-be-sent beam in a group of beams for which an SSB is sent; and sending, to User Equipment (UE), the indication information and the SSB for the to-be-sent beam.

According to a sixth aspect of embodiments of the subject disclosure, User Equipment (UE) includes a processor and memory.

The memory is adapted to storing an instruction executable by the processor.

The processor is adapted to:

receiving, from a base station, an SSB sent for a to-be-sent beam and indication information, the indication information including a number of groups of beams and an identifier, the identifier identifying whether an SSB is sent for a beam other than the to-be-sent beam in a group of beams for which an SSB is sent;

acquiring a Time Indication (TI) by parsing the SSB sent for the to-be-sent beam, and determining a location of the SSB in a group of beams including the SSB according to the TI and the number of groups of beams; and inserting, at the location in the group of beams including the SSB, an identifier identifying that the SSB is sent for the to-be-sent beam, and determining the SSB sent by the base station according to the inserted identifier and the identifier identifying whether an SSB is sent for a beam other than the to-be-sent beam in the group of beams including the SSB.

According to a seventh aspect of embodiments of the subject disclosure, a computer-readable storage medium has stored thereon a computer program that, when executed by a processor, causes the processor to implement steps of the method for synchronization block indication.

According to an eighth aspect of embodiments of the subject disclosure, a computer-readable storage medium has stored thereon a computer program that, when executed by a processor, causes the processor to implement steps of the method for synchronization block determination.

The technical solution provided by embodiments of the subject disclosure includes beneficial effects as follows.

A to-be-sent beam for which a corresponding SSB is to be sent is determined. Indication information is generated. The indication information and the SSB for the to-be-sent beam are sent to UE, such that the UE may accordingly determine a beam for which a corresponding SSB is sent by the base station. With the embodiments, the indication information combines both a group indication and intra-group indications. The indication information includes the identifier identifying whether an SSB is sent for a beam other than the to-be-sent beam in a group of beams for which an SSB is sent. That is, no identifier has to be included to identify whether an SSB is sent for the to-be-sent beam, thus reducing bit overhead while flexibly denoting any SSB sent by the base station.

A received SSB is parsed to acquire a TI. A location of the SSB in a group of beams including the SSB is determined according to the TI and a received number of groups of beams. An identifier identifying that the SSB is sent for the to-be-sent beam is inserted at the location in the group of beams including the SSB. Accordingly, an SSB sent by the base station is determined, at the cost of less bit overhead.

The above general description and elaboration below are but exemplary and explanatory, and do not limit the subject disclosure.

BRIEF DESCRIPTION OF THE DRAWINGS

Drawings here are incorporated in and constitute part of the subject disclosure, illustrate embodiments according to the subject disclosure, and together with the subject disclosure, serve to explain the principle of the subject disclosure.

DETAILED DESCRIPTION

Figure 1:
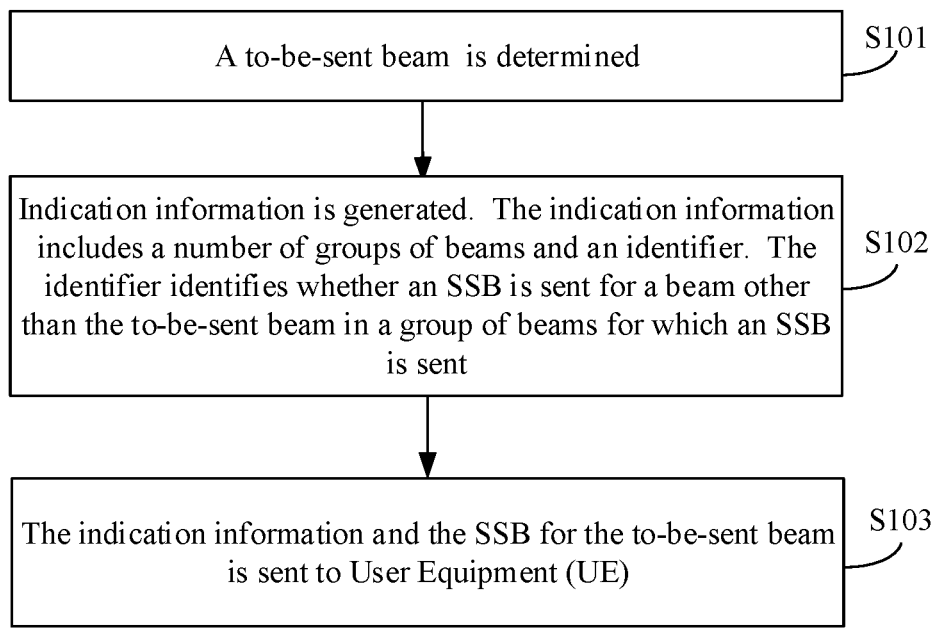
FIG. 1 is a flowchart of a method for synchronization block indication according to an exemplary embodiment of the subject disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the device and method in accordance with certain aspects of the subject disclosure as recited in the accompanying claims.

FIG. 1 is a flowchart of a method for synchronization block indication according to an exemplary embodiment of the subject disclosure. The embodiment is described from a base station side. As shown in FIG. 1, the method for synchronization block indication includes steps as follows.

In S101, a to-be-sent beam is determined.

In the embodiment, a base station may determine to send an SSB for a specific beam. The determined beam may be referred to as a to-be-sent beam. There may be one or more to-be-sent beams for which an SSB is to be sent.

In S102, indication information is generated. The indication information includes a number of groups of beams and an identifier. The identifier identifies whether an SSB is sent for a beam other than the to-be-sent beam in a group of beams for which an SSB is sent.

Optionally, the method may further include a step as follows. When or before the indication information is generated, beams may be grouped according to the number of groups of beams. For example, up to 64 beams may be divided into n groups of beams, such as 1 group of beams, 8 groups of beams, 16 groups of beams, etc. Up to 8 beams may be divided into n groups of beams, such as 1 group of beams. That is, the solution according to the embodiment may apply to both a scene of a high frequency band and a scene of a low frequency band.

The indication information may include a number of groups of beams and an identifier. The identifier may identify whether an SSB is sent for a beam other than the to-be-sent beam in a group of beams for which an SSB is sent. In addition, the indication information may further include an identifier identifying whether an SSB is sent for a group of beams.

For example, up to 64 beams may be divided into 8 groups of beams. A bitmap may be used to denote whether an SSB is sent for a group of beams. If no SSB is sent for a group 1 of beams, the information may be denoted by 0. If an SSB is sent for the group 1 of beams, the information may be denoted by 1. A bitmap {1, 1, 0, 1, 0, 1, 1, 1} corresponding to the groups of beams may denote that a corresponding SSB is sent respectively for only 6 of the groups of beams.

Note that a format other than a bitmap may also be used to denote an identifier identifying whether an SSB is sent for a group of beams.

The indication information may be carried in Remaining Minimum System Information (RMSI). The indication information may be carried in Radio Resource Control (RRC) signaling.

In a scene of a high frequency band, when the indication information is carried in RMSI, the indication information may include a number of groups of beams that is greater than 1, so as to minimize bit overhead. When the indication information is carried in RRC signaling, the indication information may include a number of groups of beams that equals 1. In this case, the identifier identifying whether an SSB is sent for a beam other than the to-be-sent beam in the group of beams may be of up to 63 bits.

In a scene of a low frequency band, when the indication information is carried in RMSI, the indication information may include a number of groups of beams that equals 1. The identifier identifying whether an SSB is sent for a beam other than the to-be-sent beam in the group of beams may be of up to 7 bits. When the indication information is carried in RRC signaling, the indication information may include a number of groups of beams that equals 1. The identifier identifying whether an SSB is sent for a beam other than the to-be-sent beam in the group of beams may be of up to 7 bits.

For clearer description of denotation of whether an SSB is sent for a beam in a group of beams, described below is an example, where 64 beams may be divided into 8 groups of beams. Each of the groups of beams may include 8 beams. A bitmap or another format may be used to denote whether an SSB is sent for each of the eight beams. To reduce bit overhead, in the embodiment, a bitmap may be used to denote the identifier identifying whether an SSB is sent for a beam other than the to-be-sent beam in a group of beams for which an SSB is sent (i.e., a group of beams with an identifier of 1). Assume that an SSB is to be sent for a to-be-sent beam 1. The beam 1 may belong to a group 1 of beams. The group 1 of beams may include a beam 0 to a beam 7. The identifier identifying whether an SSB is sent for a beam other than the beam 1 in the group 1 of beams may be denoted by {1, 1, 1, 1, 1, 1, 0}.

The indication information does not have to include an identifier for identifying whether an SSB is sent for the to-be-sent beam, because the base station is to send the SSB for the to-be-sent beam. Having received the SSB, the UE may learn that the identifier for the to-be-sent beam is 1.

In S103, the indication information and the SSB for the to-be-sent beam are sent to User Equipment (UE).

The base station may send, to the UE, the indication information and the SSB for the to-be-sent beam, such as the beam 1. Having received the indication information and the SSB, the UE may determine a beam for which a corresponding SSB is sent by the base station.

With the embodiment, a to-be-sent beam for which a corresponding SSB is to be sent is determined. Indication information is generated. The indication information and the SSB for the to-be-sent beam are sent to UE, such that the UE may accordingly determine a beam for which a corresponding SSB is sent by the base station. With the embodiments, the indication information combines both a group indication and intra-group indications. The indication information includes the identifier identifying whether an SSB is sent for a beam other than the to-be-sent beam in a group of beams for which an SSB is sent. That is, no identifier has to be included to identify whether an SSB is sent for the to-be-sent beam, thus reducing bit overhead while flexibly denoting any SSB sent by the base station.

Figure 2:
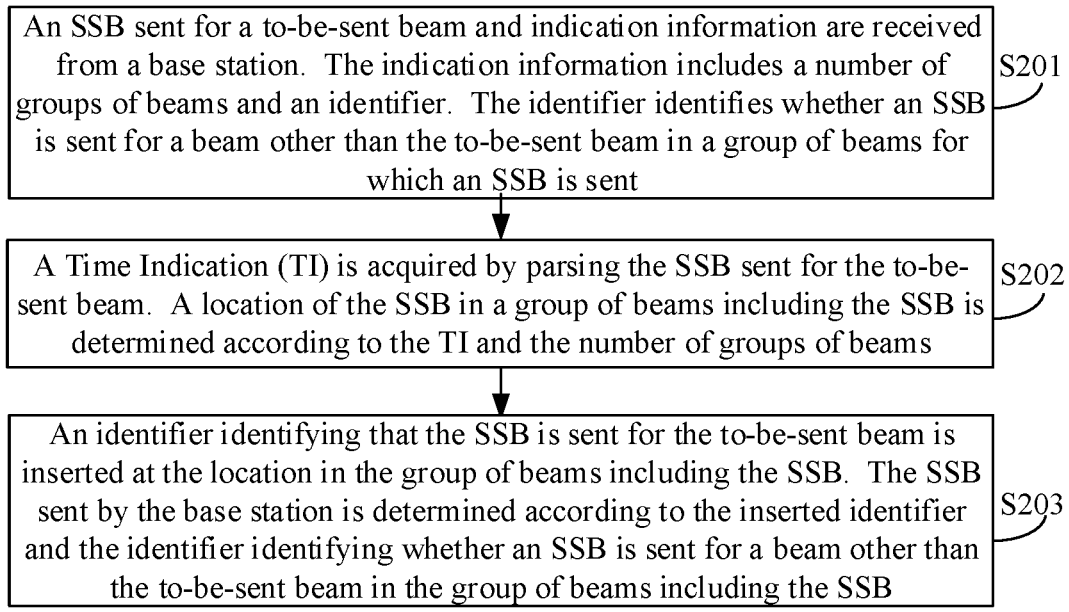
FIG. 2 is a flowchart of a method for synchronization block determination according to an exemplary embodiment of the subject disclosure.

FIG. 2 is a flowchart of a method for synchronization block determination according to an exemplary embodiment of the subject disclosure. The embodiment is described from UE side. As shown in FIG. 2, the method for synchronization block determination includes steps as follows.

In S201, an SSB sent for a to-be-sent beam and indication information are received from a base station. The indication information includes a number of groups of beams and an identifier. The identifier identifies whether an SSB is sent for a beam other than the to-be-sent beam in a group of beams for which an SSB is sent.

Optionally, the indication information may further include an identifier identifying whether an SSB is sent for a group of beams. Having received the identifier identifying whether an SSB is sent for a group of beams, the UE may determine a group of beams that includes no beam for which a corresponding SSB is sent and a group of beams that includes a beam for which a corresponding SSB is sent.

The indication information may be carried in Remaining Minimum System Information (RMSI). The indication information may be carried in Radio Resource Control (RRC) signaling.

In S202, a Time Indication (TI) is acquired by parsing the SSB sent for the to-be-sent beam. A location of the SSB in a group of beams including the SSB is determined according to the TI and the number of groups of beams.

In the embodiment, having received the SSB and the indication information sent by the base station, the UE may parse the SSB to acquire the TI. If the TI=1 and the number of groups of beams is 8, it may be determined that the SSB is sent for a beam in the group 1 of beams and that the SSB is sent for the 2nd beam in the group 1.

In S203, an identifier identifying that the SSB is sent for the to-be-sent beam is inserted at the location in the group of beams including the SSB. The SSB sent by the base station is determined according to the inserted identifier and the identifier identifying whether an SSB is sent for a beam other than the to-be-sent beam in the group of beams including the SSB.

SSB information acquired by the UE by parsing the RMSI may be incomplete. One bit in the information may have to be implied by the TI acquired by parsing the SSB. Accordingly, the UE may insert, at the determined location of a beam in the group of beams corresponding to the SSB, an identifier (such as 1) identifying that the SSB is sent for the to-be-sent beam. The UE then may determine the SSB sent by the base station according to the inserted identifier and the identifier identifying whether an SSB is sent for a beam other than the to-be-sent beam in the group of beams including the to-be-sent beam corresponding to the SSB.

For example, the UE may receive an SSB corresponding to a location 2 (of a second beam) in the group 1 of beams. The identifier identifying whether an SSB is sent for a beam other than the to-be-sent beam in the group of beams including the to-be-sent beam corresponding to the SSB may be denoted by $\{1, 1, 1, 1, 1, 1, 0\}$. In this case, 1 may be inserted at the location 2. The identifier identifying whether an SSB is sent respectively for each of the 8 beams of the group including the to-be-sent beam corresponding to the SSB may be denoted by $\{1, 1, 1, 1, 1, 1, 1, 0\}$. Accordingly, the UE may determine any beam for which a corresponding SSB is sent by the base station.

With the embodiment, a received SSB is parsed to acquire a TI. A location of the SSB in a group of beams including the SSB is determined according to the TI and a received number of groups of beams. An identifier identifying that the SSB is sent for the to-be-sent beam is inserted at the location in the group of beams including the SSB. Accordingly, an SSB sent by the base station is determined, at the cost of less bit overhead.

Figure 3:
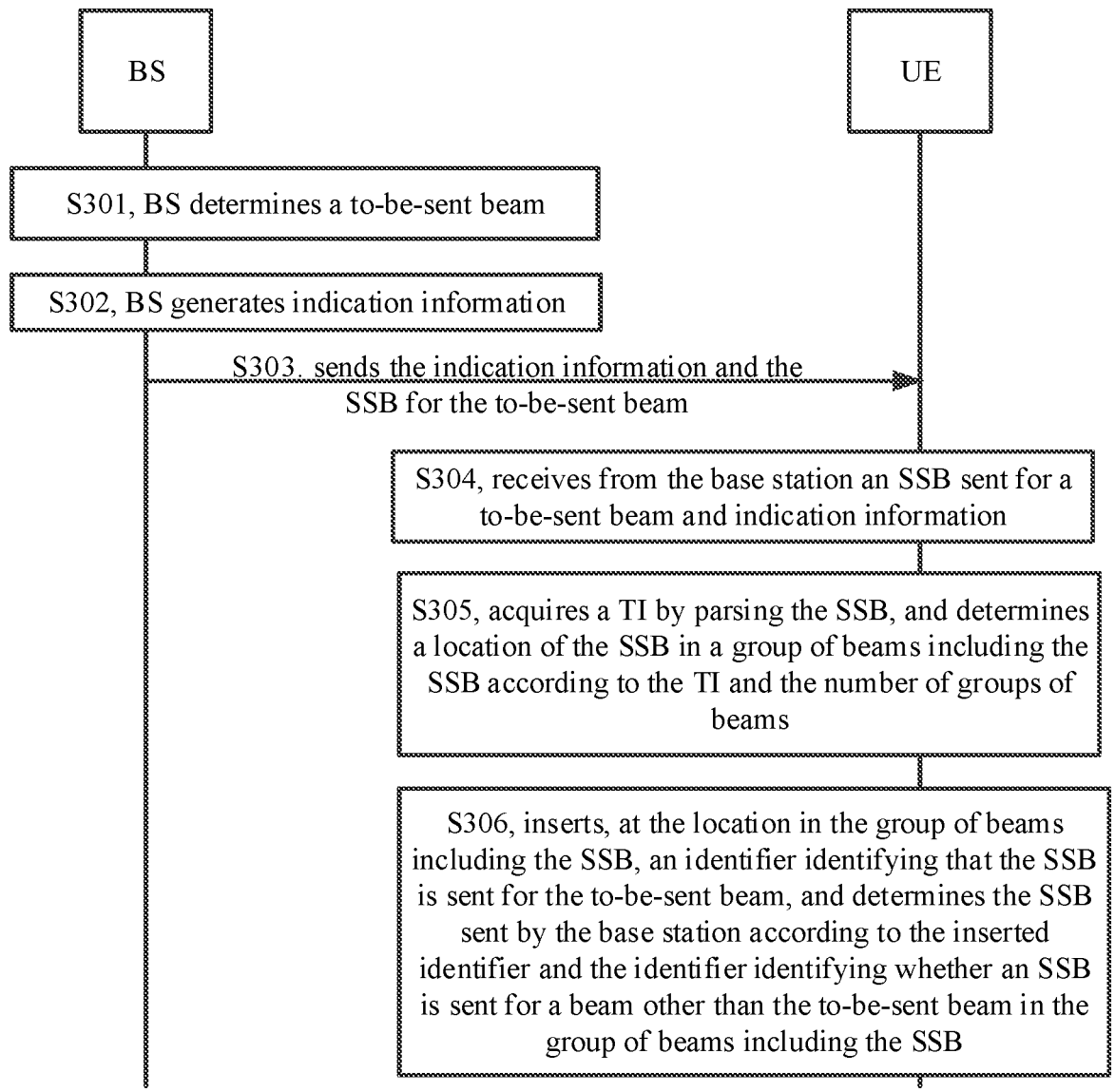
FIG. 3 is a flowchart of signaling of a method for synchronization block determination according to an exemplary embodiment of the subject disclosure.

FIG. 3 is a flowchart of signaling of a method for synchronization block determination according to an exemplary embodiment of the subject disclosure. With the embodiment, interaction between a base station and UE is described. As shown in FIG. 3, the method for synchronization block determination includes steps as follows.

In S301, a base station determines a to-be-sent beam.

In S302, the base station generates indication information. The indication information includes a number of groups of beams and an identifier. The identifier identifies whether an SSB is sent for a beam other than the to-be-sent beam in a group of beams for which an SSB is sent.

In S303, the base station sends the indication information and the SSB for the to-be-sent beam to User Equipment (UE).

In S304, the UE receives the SSB sent for the to-be-sent beam by the base station and the indication information.

In S305, the UE acquires a TI by parsing the SSB. The UE determines a location of the SSB in a group of beams including the SSB according to the TI and the number of groups of beams.

In S306, the UE inserts, at the location in the group of beams including the SSB, an identifier identifying that the SSB is sent for the to-be-sent beam. The UE determines the SSB sent by the base station according to the inserted identifier and the identifier identifying whether an SSB is sent for a beam other than the to-be-sent beam in the group of beams including the SSB.

With the embodiment, a base station and UE may interact, such that the base station may flexibly denote any SSB sent by the base station, and the UE may determine any SSB sent by the base station, while reducing bit overhead.

Figure 4:
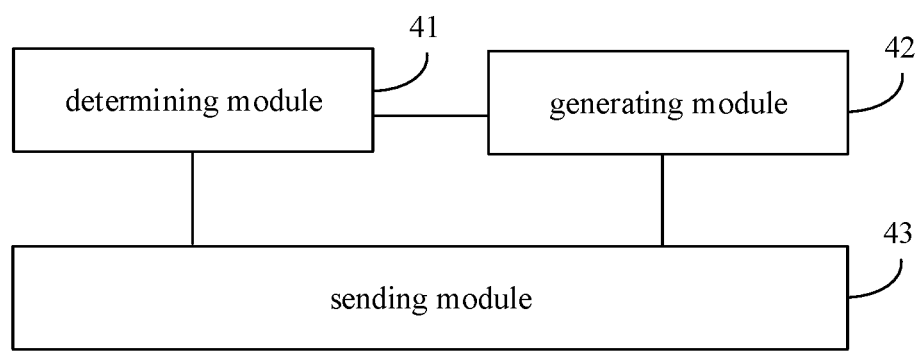
FIG. 4 is a block diagram of a device for synchronization block indication according to an exemplary embodiment.

FIG. 4 is a block diagram of a device for synchronization block indication according to an exemplary embodiment. The device for synchronization block indication may be located in a base station. As shown in FIG. 4, the device for synchronization block indication includes a determining module 41, a generating module 42, and a sending module 43.

The determining module 41 is adapted to determining a to-be-sent beam.

In the embodiment, a base station may determine to send an SSB for a specific beam. The determined beam may be referred to as a to-be-sent beam. There may be one or more to-be-sent beams for which an SSB is to be sent.

The generating module 42 is adapted to generating indication information. The indication information includes a number of groups of beams and an identifier. The identifier is adapted to identifying whether an SSB is sent for a beam other than the to-be-sent beam determined by the determining module 41 in a group of beams for which an SSB is sent.

The indication information may include a number of groups of beams and an identifier. The identifier may identify whether an SSB is sent for a beam other than the to-be-sent beam in a group of beams for which an SSB is sent. In addition, the indication information may further include an identifier identifying whether an SSB is sent for a group of beams.

For example, up to 64 beams may be divided into 8 groups of beams. A bitmap may be used to denote whether an SSB is sent for a group of beams. If no SSB is sent for a group 1 of beams, the information may be denoted by 0. If an SSB is sent for the group 1 of beams, the information may be denoted by 1. A bitmap $\{1, 1, 0, 1, 0, 1, 1, 1\}$ corresponding to the groups of beams may denote that a corresponding SSB is sent respectively for only 6 of the groups of beams.

Note that a format other than a bitmap may also be used to denote an identifier identifying whether an SSB is sent for a group of beams.

The indication information may be carried in Remaining Minimum System Information (RMSI). The indication information may be carried in Radio Resource Control (RRC) signaling.

In a scene of a high frequency band, when the indication information is carried in RMSI, the indication information may include a number of groups of beams that is greater than 1, so as to minimize bit overhead. When the indication information is carried in RRC signaling, the indication information may include a number of groups of beams that equals 1. In this case, the identifier identifying whether an SSB is sent for a beam other than the to-be-sent beam in the group of beams may be of up to 63 bits.

In a scene of a low frequency band, when the indication information is carried in RMSI, the indication information may include a number of groups of beams that equals 1. The identifier identifying whether an SSB is sent for a beam other than the to-be-sent beam in the group of beams may be of up to 7 bits. When the indication information is carried in RRC signaling, the indication information may include a number of groups of beams that equals 1. The identifier identifying whether an SSB is sent for a beam other than the to-be-sent beam in the group of beams may be of up to 7 bits.

For clearer description of denotation of whether an SSB is sent for a beam in a group of beams, described below is an example, where 64 beams may be divided into 8 groups of beams. Each of the groups of beams may include 8 beams. A bitmap or another format may be used to denote whether an SSB is sent for each of the eight beams. To reduce bit overhead, in the embodiment, a bitmap may be used to denote the identifier identifying whether an SSB is sent for a beam other than the to-be-sent beam in a group of beams for which an SSB is sent (i.e., a group of beams with an identifier of 1). Assume that an SSB is to be sent for a to-be-sent beam 1. The beam 1 may belong to a group 1 of beams. The group 1 of beams may include a beam 0 to a beam 7. The identifier identifying whether an SSB is sent for a beam other than the beam 1 in the group 1 of beams may be denoted by {1, 1, 1, 1, 1, 1, 0}.

The indication information does not have to include an identifier for identifying whether an SSB is sent for the to-be-sent beam, because the base station is to send the SSB for the to-be-sent beam. Having received the SSB, the UE may learn that the identifier for the to-be-sent beam is 1.

The sending module 43 is adapted to sending, to User Equipment (UE), the indication information generated by the generating module 42 and the SSB determined by the determining module 41 for the to-be-sent beam.

The base station may send, to the UE, the indication information and the SSB for the to-be-sent beam, such as the beam 1. Having received the indication information and the SSB, the UE may determine a beam for which a corresponding SSB is sent by the base station.

With the embodiment, a to-be-sent beam for which a corresponding SSB is to be sent is determined. Indication information is generated. The indication information and the SSB for the to-be-sent beam are sent to UE, such that the UE may accordingly determine a beam for which a corresponding SSB is sent by the base station. With the embodiments, the indication information combines both a group indication and intra-group indications. The indication information includes the identifier identifying whether an SSB is sent for a beam other than the to-be-sent beam in a group of beams for which an SSB is sent. That is, no identifier has to be included to identify whether an SSB is sent for the to-be-sent beam, thus reducing bit overhead while flexibly denoting any SSB sent by the base station.

Figure 5:
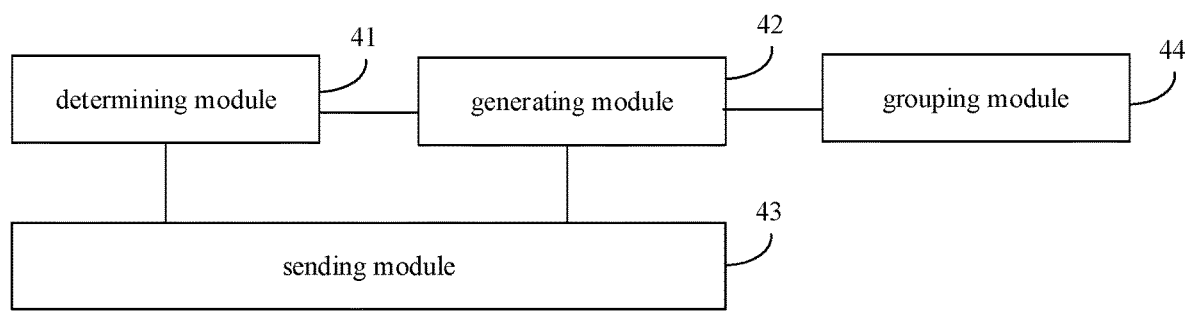
FIG. 5 is a block diagram of a device for synchronization block indication according to an exemplary embodiment.

FIG. 5 is a block diagram of a device for synchronization block indication according to an exemplary embodiment. As shown in FIG. 5, based on the embodiment shown in FIG. 4, the device may further include a grouping module 44.

The grouping module 44 may be adapted to grouping beams according to the number of groups of beams.

Optionally, the device may further include a grouping module 44. When or before the indication information is generated by the generating module 42, the grouping module 44 may group beams according to the number of groups of beams. For example, up to 64 beams may be divided into n groups of beams, such as 8 groups of beams, 16 groups of beams, etc. Up to 8 beams may be divided into n groups of beams, such as 1 group of beams. That is, the solution according to the embodiment may apply to both a scene of a high frequency band and a scene of a low frequency band.

With the embodiment, beams may be grouped according to the number of groups of beams, such that the indication information may be generated.

Figure 6:
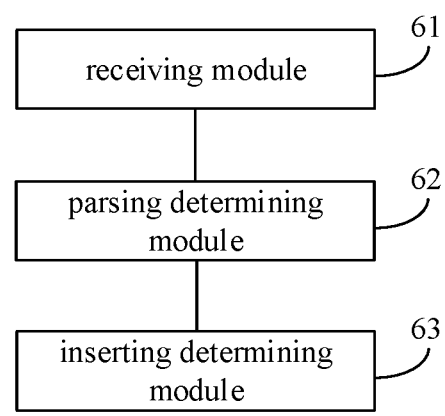
FIG. 6 is a block diagram of a device for synchronization block determination according to an exemplary embodiment.

FIG. 6 is a block diagram of a device for synchronization block determination according to an exemplary embodiment. The device for synchronization block determination may be located in UE. As shown in FIG. 6, the device includes a receiving module 61, a parsing determining module 62, and an inserting determining module 63.

The receiving module 61 is adapted to receiving, from a base station, an SSB sent for a to-be-sent beam and indication information. The indication information includes a number of groups of beams and an identifier. The identifier is adapted to identifying whether an SSB is sent for a beam other than the to-be-sent beam in a group of beams for which an SSB is sent.

Optionally, the indication information may further include an identifier identifying whether an SSB is sent for a group of beams. Having received the identifier identifying whether an SSB is sent for a group of beams, the UE may determine a group of beams that includes no beam for which a corresponding SSB is sent and a group of beams that includes a beam for which a corresponding SSB is sent.

The indication information may be carried in Remaining Minimum System Information (RMSI). The indication information may be carried in Radio Resource Control (RRC) signaling.

The parsing determining module 62 is adapted to acquiring a Time Indication (TI) by parsing the SSB received by the receiving module 61, and determining a location of the SSB in a group of beams including the SSB according to the TI and the number of groups of beams.

In the embodiment, having received the SSB and the indication information sent by the base station, the UE may parse the SSB to acquire the TI. If the TI=1 and the number of groups of beams is 8, it may be determined that the SSB is sent for a beam in the group 1 of beams and that the SSB is sent for the 2nd beam in the group 1.

The inserting determining module 63 is adapted to inserting, at the location in the group of beams including the SSB as determined by the parsing determining module 62, an identifier identifying that the SSB is sent for the to-be-sent beam, and determining the SSB sent by the base station according to the inserted identifier and the identifier identifying whether an SSB is sent for a beam other than the to-be-sent beam in the group of beams including the SSB.

SSB information acquired by the UE by parsing the RMSI may be incomplete. One bit in the information may have to be implied by the TI acquired by parsing the SSB. Accordingly, the UE may insert, at the determined location of a beam in the group of beams corresponding to the SSB, an identifier (such as 1) identifying that the SSB is sent for the to-be-sent beam. The UE then may determine the SSB sent by the base station according to the inserted identifier and the identifier identifying whether an SSB is sent for a beam other than the to-be-sent beam in the group of beams including the to-be-sent beam corresponding to the SSB.

For example, the UE may receive an SSB corresponding to a location 2 (of a second beam) in the group 1 of beams. The identifier identifying whether an SSB is sent for a beam other than the to-be-sent beam in the group of beams including the to-be-sent beam corresponding to the SSB may be denoted by {1, 1, 1, 1, 1, 1, 0}. In this case, 1 may be inserted at the location 2. The identifier identifying whether an SSB is sent respectively for each of the 8 beams of the group including the to-be-sent beam corresponding to the SSB may be denoted by {1, 1, 1, 1, 1, 1, 1, 0}. Accordingly, the UE may determine any beam for which a corresponding SSB is sent by the base station.

With the embodiment, a received SSB is parsed to acquire a TI. A location of the SSB in a group of beams including the SSB is determined according to the TI and a received number of groups of beams. An identifier identifying that the SSB is sent for the to-be-sent beam is inserted at the location in the group of beams including the SSB. Accordingly, an SSB sent by the base station is determined, at the cost of less bit overhead.

Figure 7:
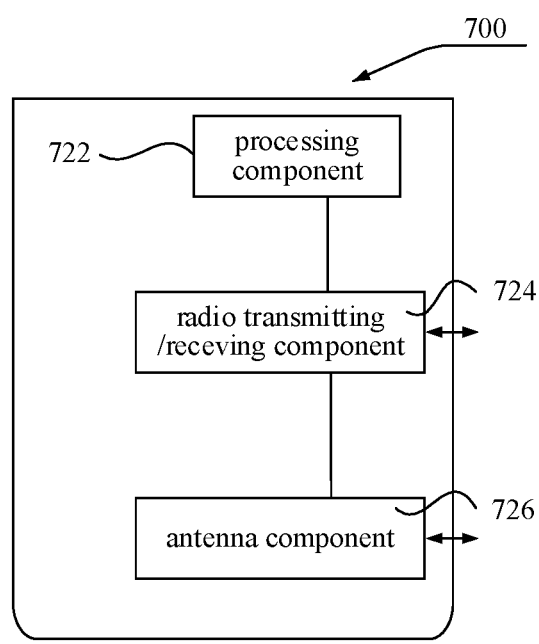
FIG. 7 is a block diagram of a device for synchronization block indication according to an exemplary embodiment.

FIG. 7 is a block diagram of a device for synchronization block indication according to an exemplary embodiment. As shown in FIG. 7, the device 700 may be provided as a base station. Referring to FIG. 7, the device 700 may include a processing component 722, a radio transmitting/receiving component 724, an antenna component 726, and a signal processing part dedicated to a radio interface. The processing component 722 may further include one or more processors.

A processor of the processing component 722 may be adapted to:

determining a to-be-sent beam;

generating indication information, the indication information including a number of groups of beams and an identifier, the identifier identifying whether an SSB is sent for a beam other than the to-be-sent beam in a group of beams for which an SSB is sent; and sending, to User Equipment (UE), the indication information and the SSB for the to-be-sent beam.

A non-transitory computer-readable storage medium including instructions may be provided. The instructions may be executed by the processing component 722 of the device 700 to implement an aforementioned method for synchronization block indication. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Figure 8:
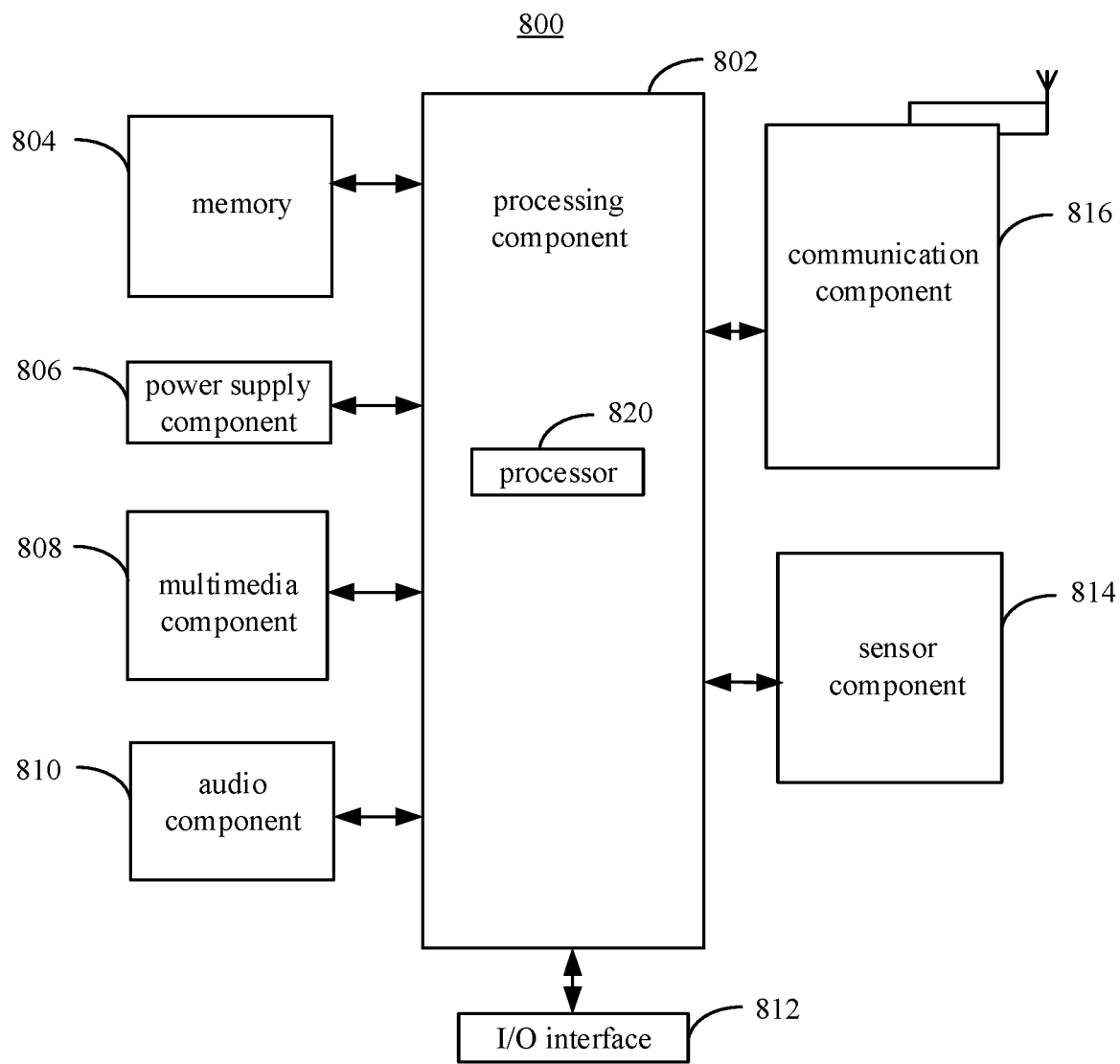
FIG. 8 is a block diagram of a device for synchronization block determination according to an exemplary embodiment.

FIG. 8 is a block diagram of a device for synchronization block determination according to an exemplary embodiment. For example, the device 800 may be UE such as a mobile phone, a computer, a digital broadcast terminal, messaging equipment, a gaming console, tablet equipment, medical equipment, fitness equipment, a personal digital assistant, etc.

Referring to FIG. 8, the device 800 may include at least one of a processing component 802, memory 804, a power supply component 806, a multimedia component 808, an audio component 810, an Input/Output (I/O) interface 812, a sensor component 814, a communication component 816, etc.

The processing component 802 may generally control an overall operation of the device 800, such as operations associated with display, a telephone call, data communication, a camera operation, a recording operation, etc. The processing component 802 may include one or more processors 820 to execute instructions so as to complete all or a part of an aforementioned method. In addition, the processing component 802 may include one or more modules to facilitate interaction between the processing component 802 and other components. For example, the processing component 802 may include a multimedia portion to facilitate interaction between the multimedia component 808 and the processing component 802.

A processor 820 of the processing component 802 may be adapted to:

receiving, from a base station, an SSB sent for a to-be-sent beam and indication information, the indication information including a number of groups of beams and an identifier, the identifier identifying whether an SSB is sent for a beam other than the to-be-sent beam in a group of beams for which an SSB is sent;

acquiring a Time Indication (TI) by parsing the SSB sent for the to-be-sent beam, and determining a location of the SSB in a group of beams including the SSB according to the TI and the number of groups of beams; and inserting, at the location in the group of beams including the SSB, an identifier identifying that the SSB is sent for the to-be-sent beam, and determining the SSB sent by the base station according to the inserted identifier and the identifier identifying whether an SSB is sent for a beam other than the to-be-sent beam in the group of beams including the SSB.

The memory 804 may be adapted to storing various types of data to support the operation at the device 800. Examples of such data may include instructions of any application or method adapted to operating on the device 800, contact data, phonebook data, messages, pictures, videos, etc. The memory 804 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 806 may supply electric power to various components of the device 800. The power supply component 806 may include a power management system, one or more power sources, and other components related to generating, managing, and distributing electricity for the device 800.

The multimedia component 808 may include a screen that provides an output interface between the device 800 and a user. In some embodiments, the screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. In some embodiments, the multimedia component 808 may include at least one of a front camera or a rear camera. When the device 800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 810 may be adapted to outputting and/or inputting an audio signal. For example, the audio component 810 may include a microphone (MIC). When the device 800 is in an operation mode such as a call mode, a recording mode, a voice recognition mode, etc., the MIC may be adapted to receiving an external audio signal. The received audio signal may be further stored in the memory 804 or may be sent via the communication component 816. In some embodiments, the audio component 810 may further include a loudspeaker adapted to outputting the audio signal.

The I/O interface 812 may provide an interface between the processing component 802 and a peripheral interface portion. Such a peripheral interface portion may be a keypad, a click wheel, a button, etc. Such a button may include but is not limited to at least one of a homepage button, a volume button, a start button, or a lock button.

The sensor component 814 may include one or more sensors for assessing various states of the device 800. For example, the sensor component 814 may detect an on/off state of the device 800 and relative positioning of components such as the display and the keypad of the device 800. The sensor component 814 may further detect a change in the position of the device 800 or of a component of the device 800, whether there is contact between the device 800 and a user, the orientation or acceleration/deceleration of the device 800, a change in the temperature of the device 800, etc. The sensor component 814 may include a proximity sensor adapted to detecting existence of a nearby object without physical contact. The sensor component 814 may further include an optical sensor such as a Complementary Metal-Oxide-Semiconductor (CMOS) or a Charge-Coupled-Device (CCD) image sensor used in an imaging application. The sensor component 814 may further include an acceleration sensor, a gyroscope sensor, a magnetic sensor, a pressure sensor, a temperature sensor, etc.

The communication component 816 may be adapted to facilitating wired or wireless communication between the device 800 and other equipment. The device 800 may access a wireless network based on a communication standard such as Wi-Fi, 2G, 3G . . . , or a combination thereof. In an exemplary embodiment, the communication component 816 may broadcast related information or receive a broadcast signal from an external broadcast management system via a broadcast channel. In an exemplary embodiment, the communication component 816 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In an exemplary embodiment, the device 800 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement an aforementioned method.

According to an exemplary embodiment, a non-transitory computer-readable storage medium including instructions, such as memory 804 including instructions, may be provided. The instructions may be executed by the processor 820 of the device 800 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

A device embodiment herein basically corresponds to a method embodiment herein, description of which may be referred to for a related part thereof. A device embodiment described herein is but schematic. Units described herein as separate parts may or may not be physically separate. A part displayed as a unit may or may not be a physical unit. That is, it may be located in one place, or distributed over multiple network units. Some or all of the modules herein may be selected as needed to achieve an effect of a solution of an embodiment herein. A person having ordinary skill in the art may understand and implement the above without creative effort.

Note that herein, a relation term such as "first," "second," etc., is used merely to differentiate one entity or operation from another without necessarily requiring or implying existence of such an actual relation or order between such entities. A term such as "including/comprising," "containing," or any other variant thereof is intended to cover a non-exclusive inclusion, such that a process, method, article, or equipment including a series of elements not only includes the elements, but also includes the other element(s) not explicitly listed, or the element(s) inherent to such a process, method, article, or equipment. Given no more limitation, an element defined by a phrase "including a . . . " does not exclude existence of another identical element in a process, method, article, or device that includes the element.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

The invention claimed is:

1. A method for synchronization block indication, applying to a base station, the method comprising:
   determining a to-be-sent beam;
   generating indication information, the indication information comprising a number of groups of beams and an identifier, the identifier identifying whether a Synchronization Signal Block (SSB) is sent for a beam other than the to-be-sent beam in a group of beams for which an SSB is sent; and
   sending, to User Equipment (UE), the indication information and the SSB for the to-be-sent beam.

2. The method of claim 1, further comprising:
   grouping beams according to the number of groups of beams.

3. The method of claim 1, wherein the indication information further comprises an identifier identifying whether an SSB is sent for a group of beams.

4. The method of claim 1, wherein the indication information is carried in Remaining Minimum System Information (RMSI) or Radio Resource Control (RRC) signaling.

5. A communication system implementing the method of claim 1, comprising the base station, wherein the indication information combines both a group indication and intra-group indications.

6. The communication system of claim 5, wherein no identifier is included to identify whether an SSB is sent for the to-be-sent beam, thus reducing bit overhead while flexibly denoting any SSB sent by the base station.

7. The communication system of claim 6, further comprising the UE, wherein the UE is configured to parse the received SSB to acquire a Time Indication (TI).

8. The communication system of claim 7, wherein the UE is further configured to determine a location of the SSB in a group of beams including the SSB according to the TI and a received number of groups of beams.

9. The communication system of claim 8, wherein the UE is further configured to insert the identifier identifying that the SSB is sent for the to-be-sent beam at a location in the group of beams including the SSB, thereby determining the SSB sent by the base station is determined with reduced bit overhead.

10. A method for synchronization block determination, applying to User Equipment (UE), the method comprising:
    receiving, from a base station, a Synchronization Signal Block (SSB) sent for a to-be-sent beam and indication information, the indication information comprising a number of groups of beams and an identifier, the identifier identifying whether an SSB is sent for a beam other than the to-be-sent beam in a group of beams for which an SSB is sent;

acquiring a Time Indication (TI) by parsing the SSB sent for the to-be-sent beam, and determining a location of the SSB in a group of beams including the SSB according to the TI and the number of groups of beams; and inserting, at the location in the group of beams including the SSB, an identifier identifying that the SSB is sent for the to-be-sent beam, and determining the SSB sent by the base station according to the inserted identifier and the identifier identifying whether an SSB is sent for a beam other than the to-be-sent beam in the group of beams including the SSB.

11. The method of claim 10, wherein the indication information further comprises an identifier identifying whether an SSB is sent for a group of beams.

12. The method of claim 10, wherein the indication information is carried in Remaining Minimum System Information (RMSI) or Radio Resource Control (RRC) signaling.

13. A base station, comprising a processor and memory, wherein the memory is adapted to storing an instruction executable by the processor,
wherein the processor is adapted to:
determining a to-be-sent beam;
generating indication information, the indication information comprising a number of groups of beams and an identifier, the identifier identifying whether a Synchronization Signal Block (SSB) is sent for a beam other than the to-be-sent beam in a group of beams for which an SSB is sent; and
sending, to User Equipment (UE), the indication information and the SSB for the to-be-sent beam.

14. The base station of claim 13, wherein the processor is further adapted to grouping beams according to the number of groups of beams.

15. The base station of claim 13, wherein the indication information further comprises an identifier identifying whether an SSB is sent for a group of beams.

16. The base station of claim 13, wherein the indication information is carried in Remaining Minimum System Information (RMSI) or Radio Resource Control (RRC) signaling.

* * * * *